United States Patent
Liu et al.

(10) Patent No.: US 9,071,735 B2
(45) Date of Patent: Jun. 30, 2015

(54) NAME MANAGEMENT AND GROUP RECOVERY METHODS AND SYSTEMS FOR BURST SHOT

(71) Applicant: HTC CORPORATION, Taoyuan, Taoyuan County (TW)

(72) Inventors: Jian-Chyn Liu, Taoyuan (TW); I-Fen Shih, Taoyuan (TW); Sheng-Chin Chuang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 142 days.

(21) Appl. No.: 13/874,855

(22) Filed: May 1, 2013

(65) Prior Publication Data

US 2014/0327795 A1    Nov. 6, 2014

(51) Int. Cl.
*H04N 5/76* (2006.01)
*H04N 1/21* (2006.01)

(52) U.S. Cl.
CPC ..................... *H04N 1/215* (2013.01)

(58) Field of Classification Search
CPC .............................. H04N 1/2129; H04N 1/215
See application file for complete search history.

(56) References Cited

U.S. PATENT DOCUMENTS

| | | | |
|---|---|---|---|
| 2002/0140826 A1* | 10/2002 | Sato et al. | 348/222.1 |
| 2009/0207279 A1* | 8/2009 | Ochi et al. | 348/231.99 |
| 2009/0217204 A1* | 8/2009 | Yamashita | 715/838 |
| 2010/0274978 A1* | 10/2010 | Koike et al. | 711/154 |
| 2011/0096199 A1* | 4/2011 | Ejima et al. | 348/231.99 |
| 2012/0120260 A1* | 5/2012 | Yumiki | 348/207.2 |
| 2012/0162469 A1* | 6/2012 | Han et al. | 348/231.2 |
| 2012/0249853 A1* | 10/2012 | Krolczyk et al. | 348/333.01 |
| 2012/0288147 A1* | 11/2012 | Fujitani | 382/103 |
| 2014/0055629 A1* | 2/2014 | Ochi et al. | 348/208.1 |
| 2014/0337324 A1* | 11/2014 | Chao et al. | 707/722 |

* cited by examiner

*Primary Examiner* — Lin Ye
*Assistant Examiner* — John H Morehead, III
(74) *Attorney, Agent, or Firm* — CKC & Partners Co., Ltd.

(57) ABSTRACT

Name management and group recovery methods and systems for burst shot are provided. In name management, a burst shot is performed to continuously capture a group of images in sequence. Each of the images in the group is named with a same prefix, and a respective infix, wherein the infixes of the respective images are progressively increased along the period of the burst shot. One of the images within the group is selected as a cover image of the group, and a specific postfix is added to the name of the selected image. In group recovery, if a specific image having a name comprising the specific postfix is in the electronic device, images having a name comprising at least one predefined text in an infix corresponding to the specific image are retrieved and grouped, and the burst bit of each grouped image is enabled.

14 Claims, 12 Drawing Sheets

NAME MANAGEMENT AND GROUP RECOVERY METHODS AND SYSTEMS FOR BURST SHOT

BACKGROUND OF THE INVENTION

1. Field of the Invention

The disclosure relates generally to burst shot management, and, more particularly to name management and group recovery methods and systems for burst shot.

2. Description of the Related Art

Recently, portable devices, such as handheld devices, have become more and more technically advanced and multifunctional. For example, a handheld device may have telecommunications capabilities, e-mail message capabilities, image capture capabilities, an advanced address book management system, a media playback system, and various other functions. Due to increased convenience and functions of the devices, these devices have become necessities of life.

Currently, an inventive function called 'Burst Shot' is provided on the portable devices. In the burst shot mode, the image capture unit, such as a camera takes images immediately one after another in a short amount of time. That is, when the burst shot function is performed, a continuous high-speed image capture process is performed to continuously capture a plurality of images in sequence.

Conventionally, the continuously captured images corresponding to the burst shot may be stored and grouped in a memory card of the portable device. However, when the memory card is removed from the portable device to another device, such as portable device or computer, the group relationship among the images may be lost, that is the respective images are regarded as independent ones.

BRIEF SUMMARY OF THE INVENTION

Name management and group recovery methods and systems for burst shot are provided.

In an embodiment of a name management method for burst shot, a burst shot is performed to continuously capture a group of a plurality of images in sequence. Each of the images in the group is named with a same prefix, and a respective infix. The infixes of the respective images are progressively increased along the period of the burst shot. One of the images within the group is selected as a cover image of the group, and a specific postfix is added to the name of the selected image.

An embodiment of a name management system for burst shot comprises an image capture unit and a processing unit. The image capture unit continuously captures a group of a plurality of images in sequence when a burst shot is performed. The processing unit names each of the images in the group with a same prefix, and a respective infix, wherein the infixes of the respective images are progressively increased along the period of the burst shot. The processing unit selects one of the images within the group as a cover image of the group, and adds a specific postfix to the name of the selected image.

In some embodiments, a burst bit of each of the images in the group is enabled, and a cover bit corresponding to the selected image is enabled.

In some embodiments, a re-selection of one of the images within the group as the cover image of the group is received. The specific postfix is removed from the name of the originally selected image, and the specific postfix is added to the name of the re-selected image. In some embodiments, a cover bit corresponding to the originally selected image is disabled, and the cover bit corresponding to the re-selected image is enabled.

In some embodiments, when an expansion instruction is received, the specific postfix is removed from the name of the originally selected image, a burst bit of each of the images in the group is removed, and a cover bit corresponding to the selected image is removed.

In some embodiments, when a best instruction is received, in which one of the images is selected as a best image within the group, the specific postfix is removed from the name of the originally selected image. Then, a burst bit of each of the images in the group is removed, a cover bit corresponding to the originally selected image is removed, and the images except the best image are removed.

In some embodiments, when a best instruction is received, in which one of the images is selected as a best image within the group, the images except the best image are removed. Then, a burst bit of the best image is removed. It is determined whether the name of the best image comprises the specific postfix. If the name of the best image comprises the specific postfix, the specific postfix is removed from the name of the best image, and a cover bit corresponding to the best image is removed.

In some embodiments, the prefix comprises a first part of at least one first predefined text and a second part of an image index corresponding to an image capture process given by the electronic device. The infix of the respective image comprises a first part of at least one second predefined text and a second part of a number corresponding to the capture order of the respective image in the group.

In some embodiments, it is determined whether a burst bit of the selected image is not enabled. If the burst bit of the selected image is not enabled, images having a name comprising the prefix corresponding to the selected image and the at least one second predefined text are retrieved and grouped, and the burst bit of each grouped image is enabled.

In an embodiment of a group recovery method for burst shot, it is determined whether at least one image having a name comprising the specific postfix is in the electronic device. If a specific image having a name comprising the specific postfix is in the electronic device, images having a name comprising at least one predefined text in an infix corresponding to the specific image are retrieved and grouped, and a burst bit of each grouped image is enabled.

An embodiment of a group recovery system for burst shot comprises a storage unit and a processing unit. The storage unit comprises a plurality of images. The processing unit determines whether at least one image having a name comprising a specific postfix is in the storage unit. If a specific image having a name comprising the specific postfix is in the storage unit, the processing unit retrieves and groups images having a name comprising at least one predefined text in an infix corresponding to the specific image, and enables the burst bit of each grouped image.

In some embodiments, it is determined whether a cover bit of the specific image is not enabled. If the cover bit of the specific image is not enabled, the cover bit of the specific image is enabled.

Name management and group recovery methods for burst shot may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Name management and group recovery methods for burst shot are provided.

Figure 1:
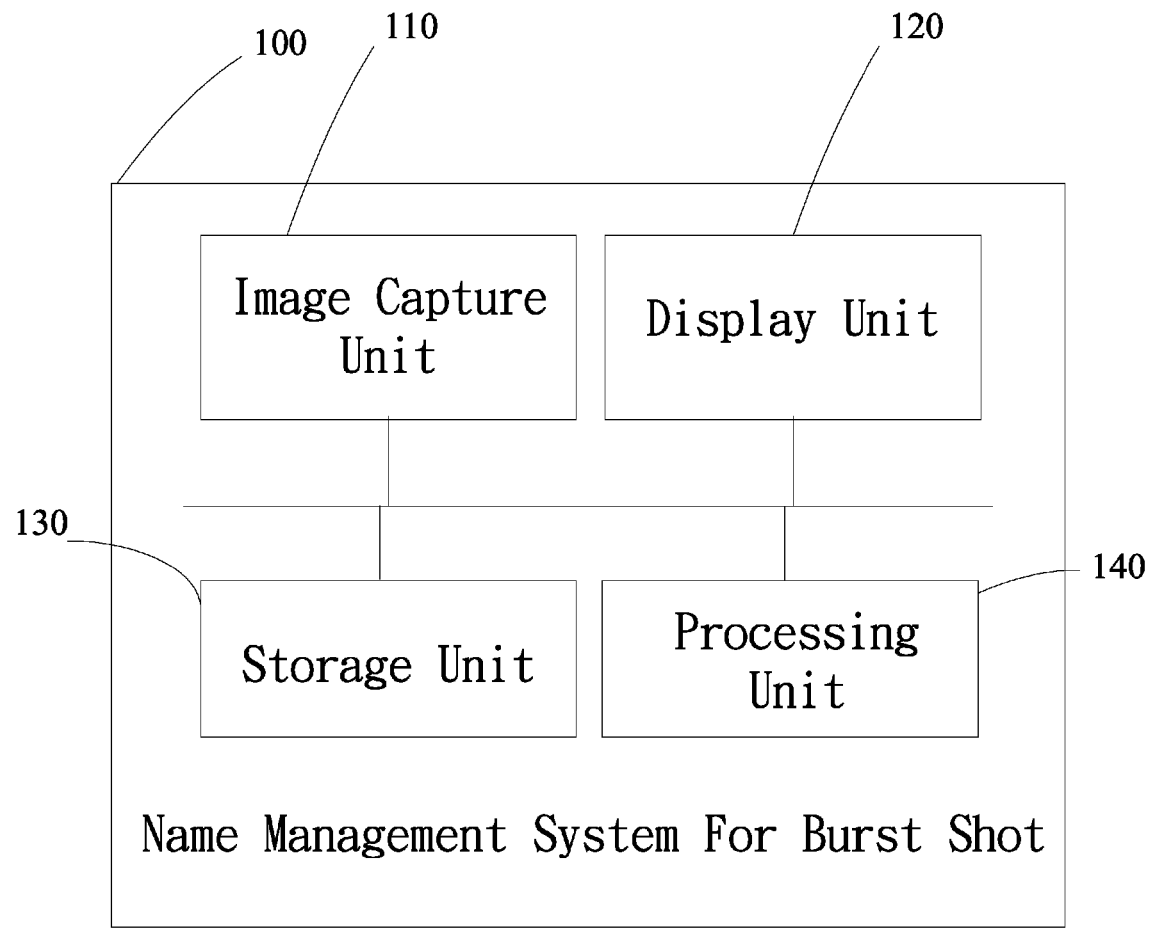
FIG. 1 is a schematic diagram illustrating an embodiment of a name management system for burst shot of the invention.

FIG. 1 is a schematic diagram illustrating an embodiment of a name management system for burst shot of the invention. The name management system for burst shot 100 can be used in an electronic device having image capture capability, such as a digital camera, or a picture-taking handheld device such as a mobile phone, a smart phone, a PDA (Personal Digital Assistant), and a GPS (Global Positioning System).

The name management system for burst shot 100 comprises an image capture unit 110, a display unit 120, a storage unit 130, and a processing unit 140. The image capture unit 110 may be a CCD (Charge Coupled Device) or a CMOS (Complementary Metal-Oxide Semiconductor), placed at the imaging position for objects inside the electronic device. The display unit 120 can display related figures and interfaces, and related data, such as the preview images continuously captured by the image capture unit 110, and the images captured by the image capture unit 110 during a normal photography process and/or a burst shot process. It is noted that, the preview image is not actually stored in the storage unit 130. It is understood that, in some embodiments, the display unit 120 may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit 120. It is understood that, the image data captured by the image capture unit 110 can be permanently or temporarily stored in the storage unit 130, which may be a built-in memory, or an external memory card of the name management system for burst shot 100. The processing unit 140 can control related components of the name management system for burst shot 100, process the preview images continuously captured by the image capture unit 110, and/or the images captured by the image capture unit 110 during the normal photography process and/or the burst shot process, and perform the name management methods for burst shot of the invention, which will be discussed further in the following paragraphs. It is noted that, the name management system for burst shot 100 can further comprise a focus unit (not shown in FIG. 1). The processing unit 140 can control the focus unit to perform a focus process for at least one object during the normal photography process and/or the burst shot process.

Figure 2:
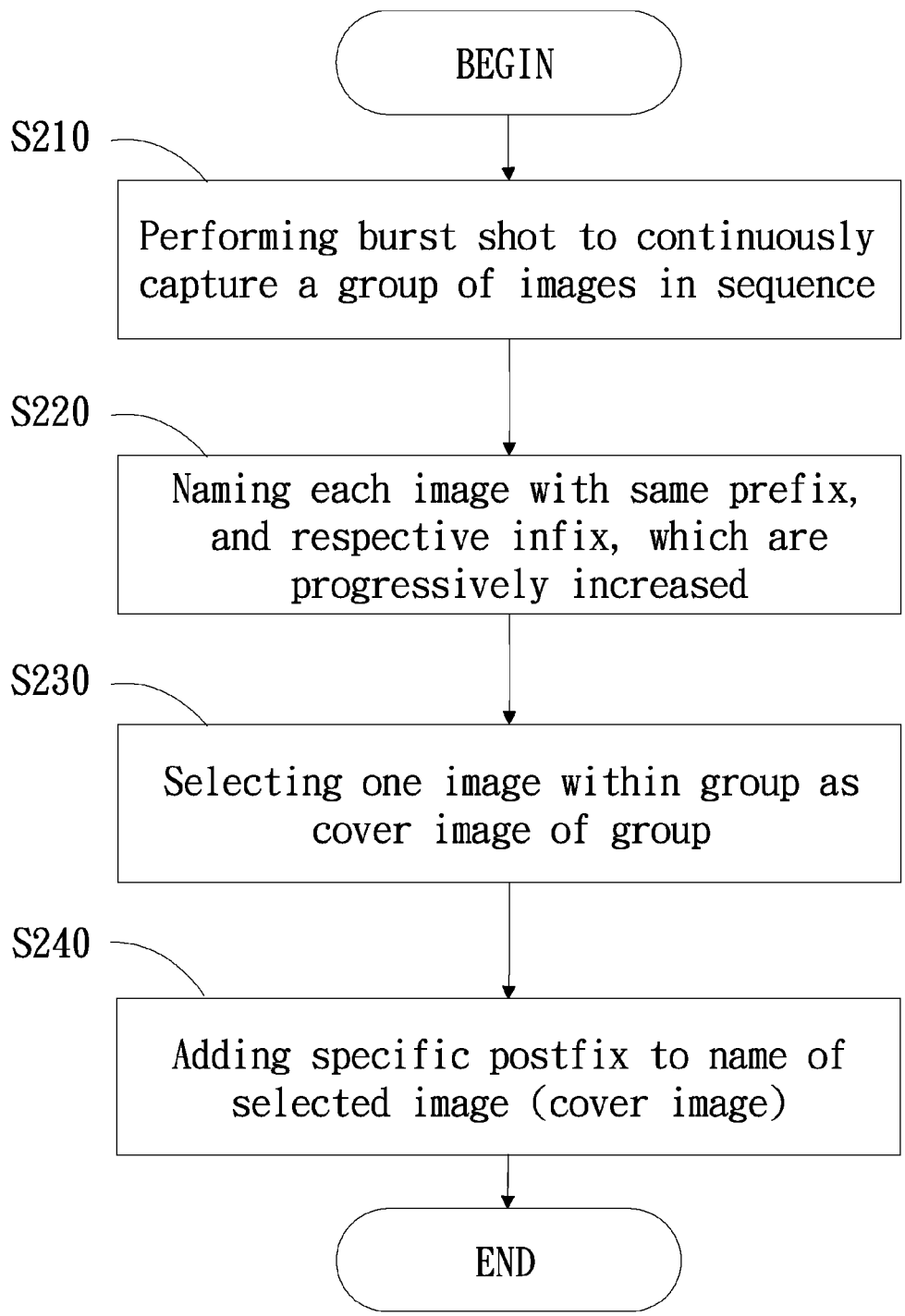
FIG. 2 is a flowchart of an embodiment of a name management method for burst shot of the invention.

FIG. 2 is a flowchart of an embodiment of a name management method for burst shot of the invention. The name management method for burst shot can be used in an electronic device having image capture capability, such as a digital camera, or a picture-taking handheld device such as a mobile phone, a smart phone, a PDA, and a GPS. In the embodiment, images captured during a burst shot are named.

In step S210, a burst shot is performed to continuously capture a group of a plurality of images in sequence via an image capture unit. In step S220, each of the images in the group is named with a same prefix, and a respective infix. It is noted that, the infixes of the respective images are progressively increased along the period of the burst shot. It is understood that, in some embodiments, the prefix can comprise a first part of at least one first predefined text and a second part of an image index corresponding to an image capture process given by the electronic device. Additionally, the infix of the respective image can comprise a first part of at least one second predefined text and a second part of a number corresponding to the capture order of the respective image in the group. For example, the name of a specific image within the group may be IMAG0002_BURST003.jpg, in which 'IMAG' is the at least one first predefined text, '0002' is the image index corresponding to the image capture process given by the electronic device, 'BURST' is the at least one second predefined text, and '003' is the number corresponding to the capture order of the specific image in the group. In step S230, one of the images within the group is selected as a cover image of the group, and in step S240, a specific postfix is added to the name of the selected image. It is understood that, in some embodiments, the second one of the continuously captured images can be selected as the cover image of the group. In an example, the name of a specific image within the group may be IMAG0002_BURST002_COVER.jpg, in which 'IMAG' is the at least one first predefined text, '0002' is the image index corresponding to the image capture process given by the electronic device, 'BURST' is the at least one second predefined text, '002' is the number corresponding to the capture order of the specific image in the group, and 'COVER' is the specific postfix. Each image in group of a plurality of images goes through step S220 to S240 once capturing.

It is understood that, in some embodiments, the respective image corresponding to a burst shot may have a burst bit and a cover bit, which may be recorded in any field of an image format designed for recording additional data. In some embodiments, the burst bit of each image in the group is enabled and the cover bit corresponding to the selected image (cover image) is enabled.

It is noted that, the present invention provides several functions to further manage images of burst shot. In some embodiments, functions for cover selection, group expansion, and/or best image selection can be provided.

Figure 3:
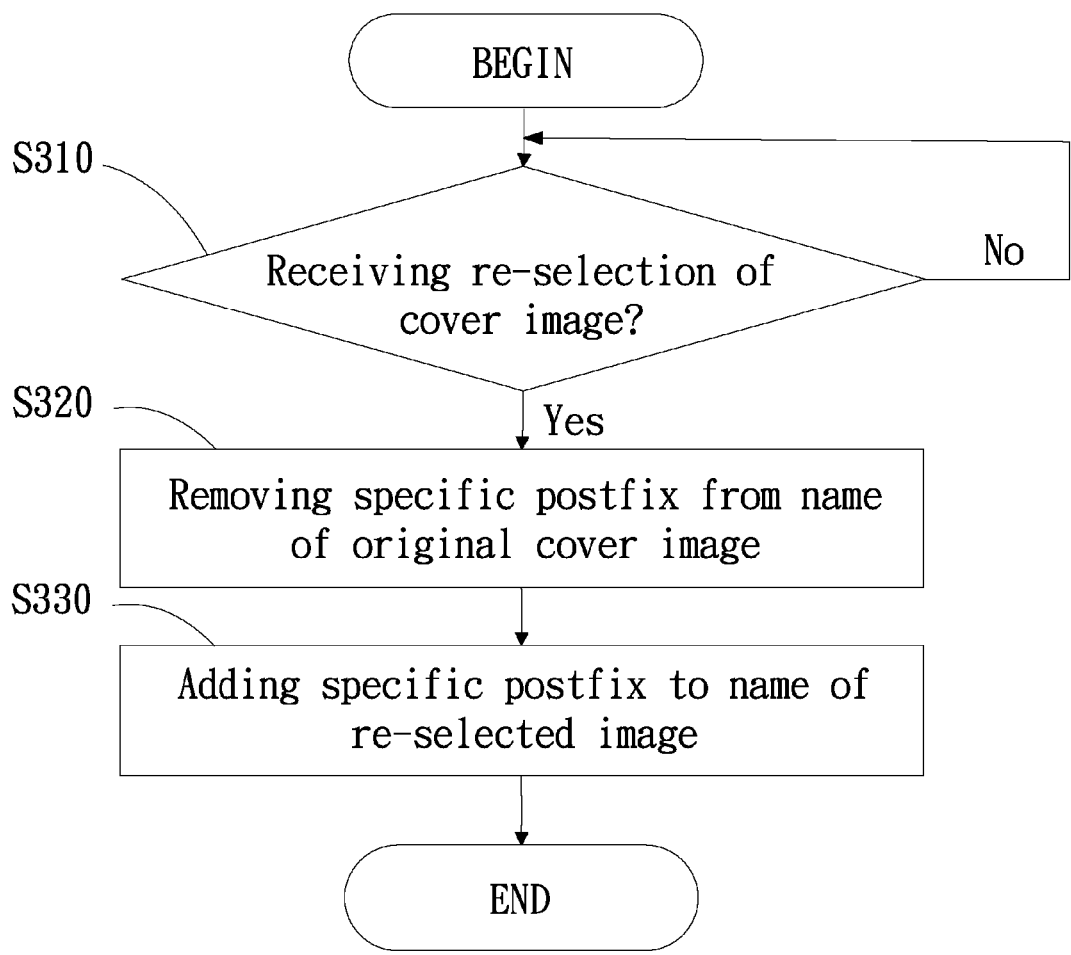
FIG. 3 is a flowchart of another embodiment of a name management method for burst shot of the invention.

FIG. 3 is a flowchart of another embodiment of a name management method for burst shot of the invention. In the embodiment, the cover image of a group corresponding to a burst shot is re-selected.

In step S310, it is determined whether a re-selection of one of the images within the group as the cover image of the group is received. If no re-selection corresponding to the cover image is received (No in step S310), the procedure remains at step S310. If a re-selection of one of the images within the group as the cover image of the group is received (Yes in step S310), in step S320, the specific postfix is removed from the name of the originally selected image (original cover image), and in step S330, the specific postfix is added to the name of the re-selected image. As described, the respective image corresponding to a burst shot may have a burst bit and a cover bit. In some embodiments, the cover bit corresponding to the originally cover image is disabled, and the cover bit corresponding to the re-selected image is enabled.

For example, it is assumed that a group of burst images includes three images, 'IMAG0002_BURST001.jpg', 'IMAG0002_BURST002_COVER.jpg', and 'IMAG0002_BURST003.jpg', wherein the specific postfix is 'COVER', that is the name of the cover image of the group is IMAG0002_BURST002_COVER.jpg'. When the image 'IMAG0002_BURST003.jpg' is re-selected as the cover image of the group, the name of the original cover image 'IMAG0002_BURST002_COVER.jpg' is modified as 'IMAG0002_BURST002.jpg' by removing the specific postfix 'COVER', and the name of the new cover image is modified as 'IMAG0002_BURST003_COVER.jpg'. Additionally, the cover bit corresponding to the original cover image 'IMAG0002_BURST002.jpg' is disabled, and the cover bit corresponding to the new cover image 'IMAG0002_BURST003_COVER.jpg' is enabled.

Figure 7:
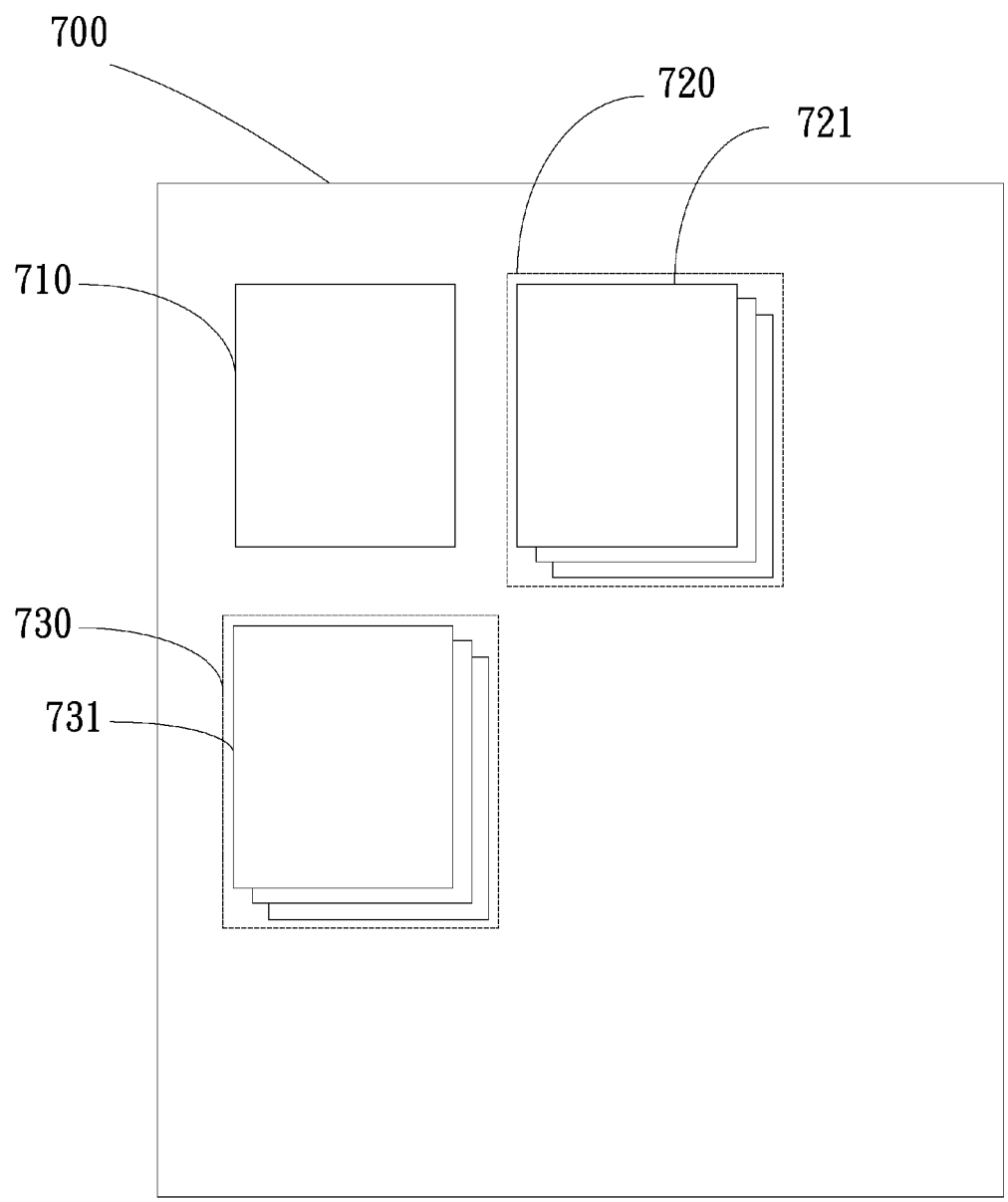
FIG. 7 is a schematic diagram illustrating an example of an interface displaying images of the invention.

FIG. 7 is a schematic diagram illustrating an example of an interface displaying images of the invention. In this example, the interface 700 displays an image 710, a first group of burst images 720, and a second group of burst images 730, in which the image 721 is the cover image of the first group 720, and the image 731 is the cover image of the second group 730. It is noted that, in FIG. 7, burst images are grouped and displayed in the interface 700 with the cover image as a representative image. In some implementations, the respective burst images in the group will be simultaneously displayed in the interface once the representative image is selected, or touched via a touch-sensitive display unit. As described, the cover image of a group of burst images can be re-selected. Once a specific image is selected as the cover image of the group, the selected specific image can be displayed as the representative image corresponding to the group.

Figure 4:
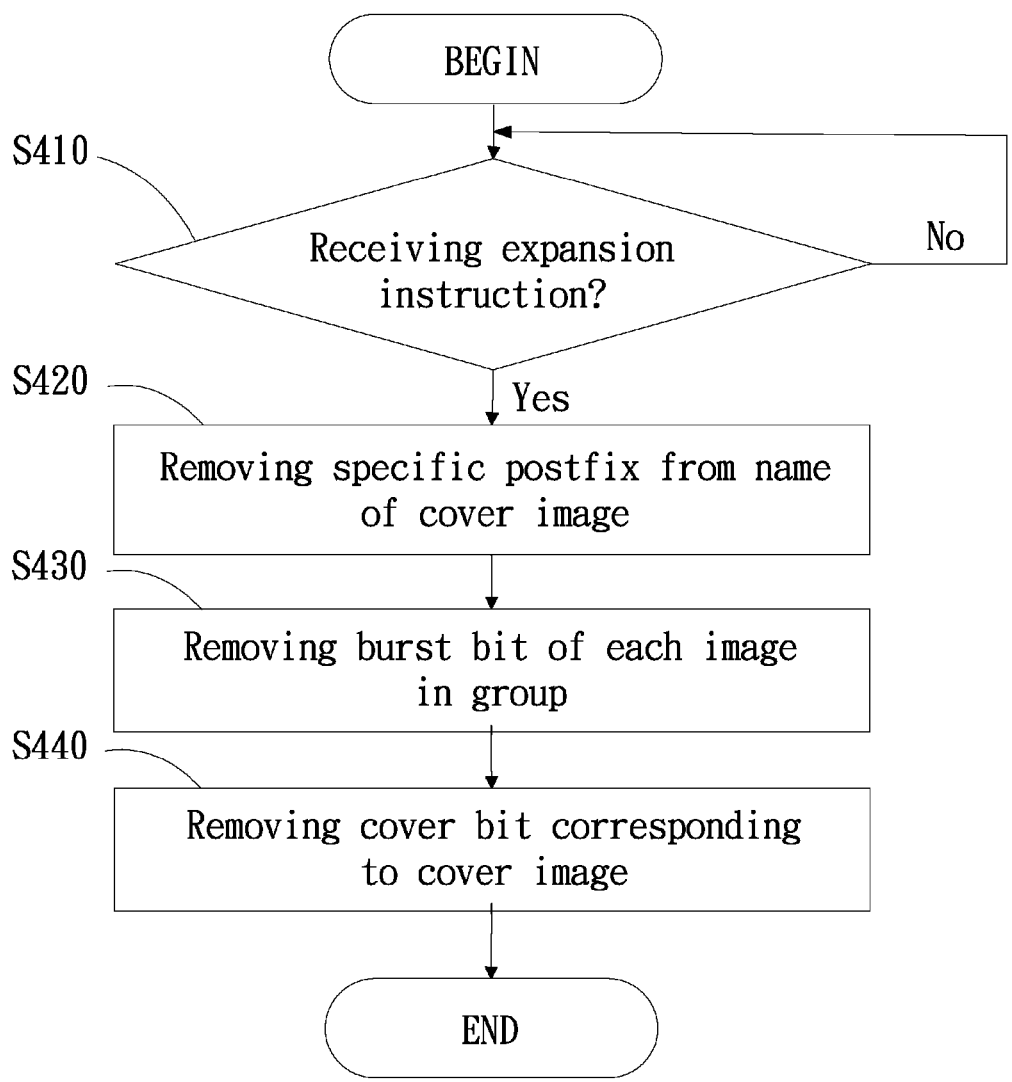
FIG. 4 is a flowchart of another embodiment of a name management method for burst shot of the invention.

FIG. 4 is a flowchart of another embodiment of a name management method for burst shot of the invention. In the embodiment, the burst images of a group corresponding to a burst shot are expanded, such that the images become independent with each other, that is the group relationship among the images is no longer existed.

In step S410, it is determined whether an expansion instruction for a group of burst images is received. If no expansion instruction is received (No in step S410), the procedure remains at step S410. If an expansion instruction for a group of burst images is received (Yes in step S410), in step S420, the specific postfix is removed from the name of the cover image. Then, in step S430, a burst bit of each of the images in the group is removed, and in step S440, a cover bit corresponding to the cover image is removed. Each image goes step S420 to step S440 once the expansion instruction is received.

Figure 8:
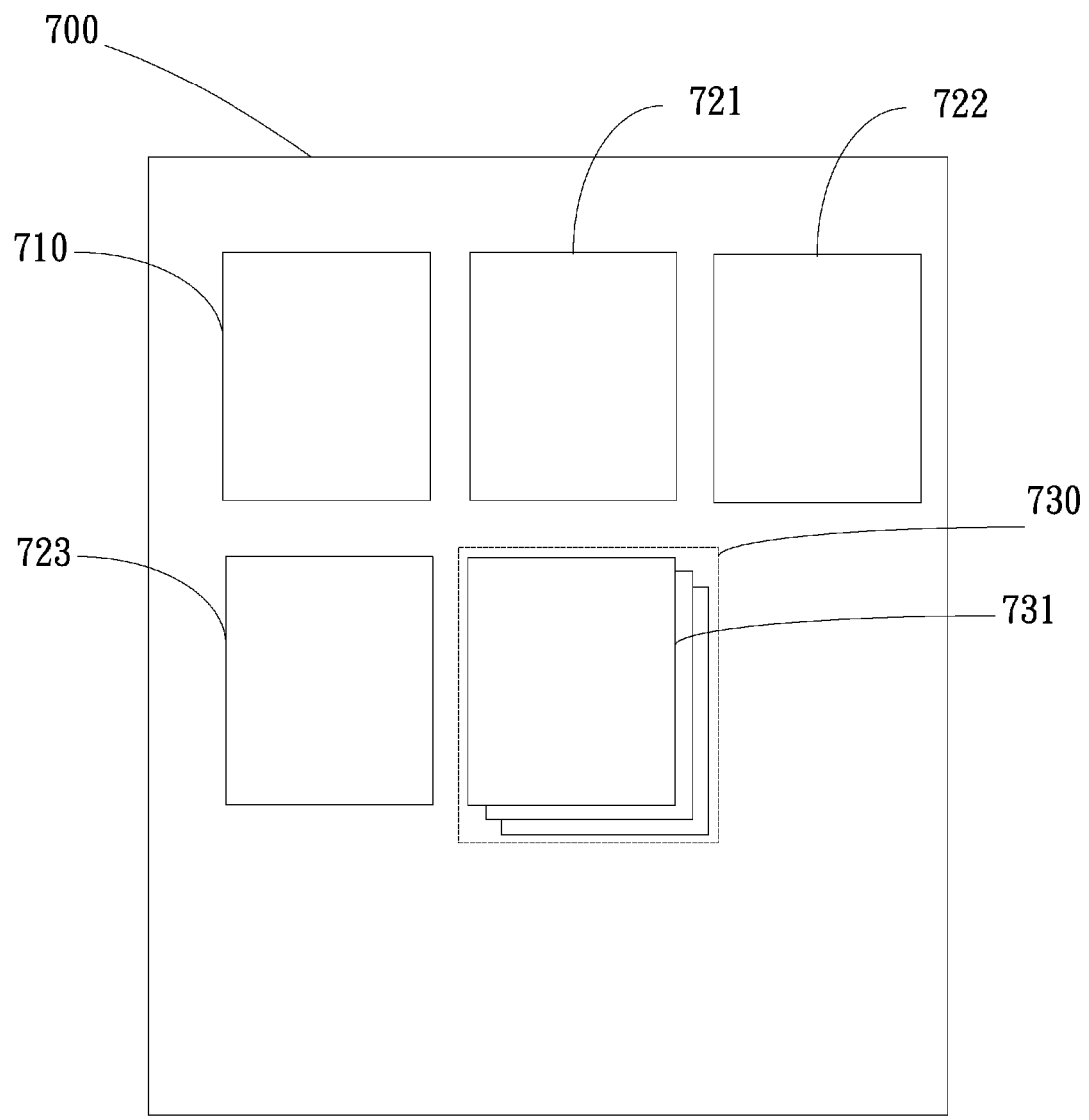
FIG. 8 is a schematic diagram illustrating an example of an interface displaying images upon an expansion instruction of the invention.

For example, it is assumed that a group of burst images includes three images, 'IMAG0002_BURST001.jpg', 'IMAG0002_BURST002_COVER.jpg', and IMAG0002_BURST003.jpg', wherein the specific postfix is 'COVER', that is the name of the cover image of the group is IMAG0002_BURST002_COVER.jpg'. When an expansion instruction for the group is received, the name of the cover image 'IMAG0002_BURST002_COVER.jpg' is modified as 'IMAG0002_BURST002.jpg' by removing the specific postfix 'COVER'. Additionally, the cover bit corresponding to the cover image IMAG0002_BURST002.jpg' is removed, and the burst bit of each image is removed. Referring to FIG. 7 again, when an expansion instruction for the group 720 is received, the burst images are expanded into independent images 721, 722 and 723, and displayed in the interface 700, as shown in FIG. 8.

Two embodiments for best instruction are discussed as follows.

Figure 5:
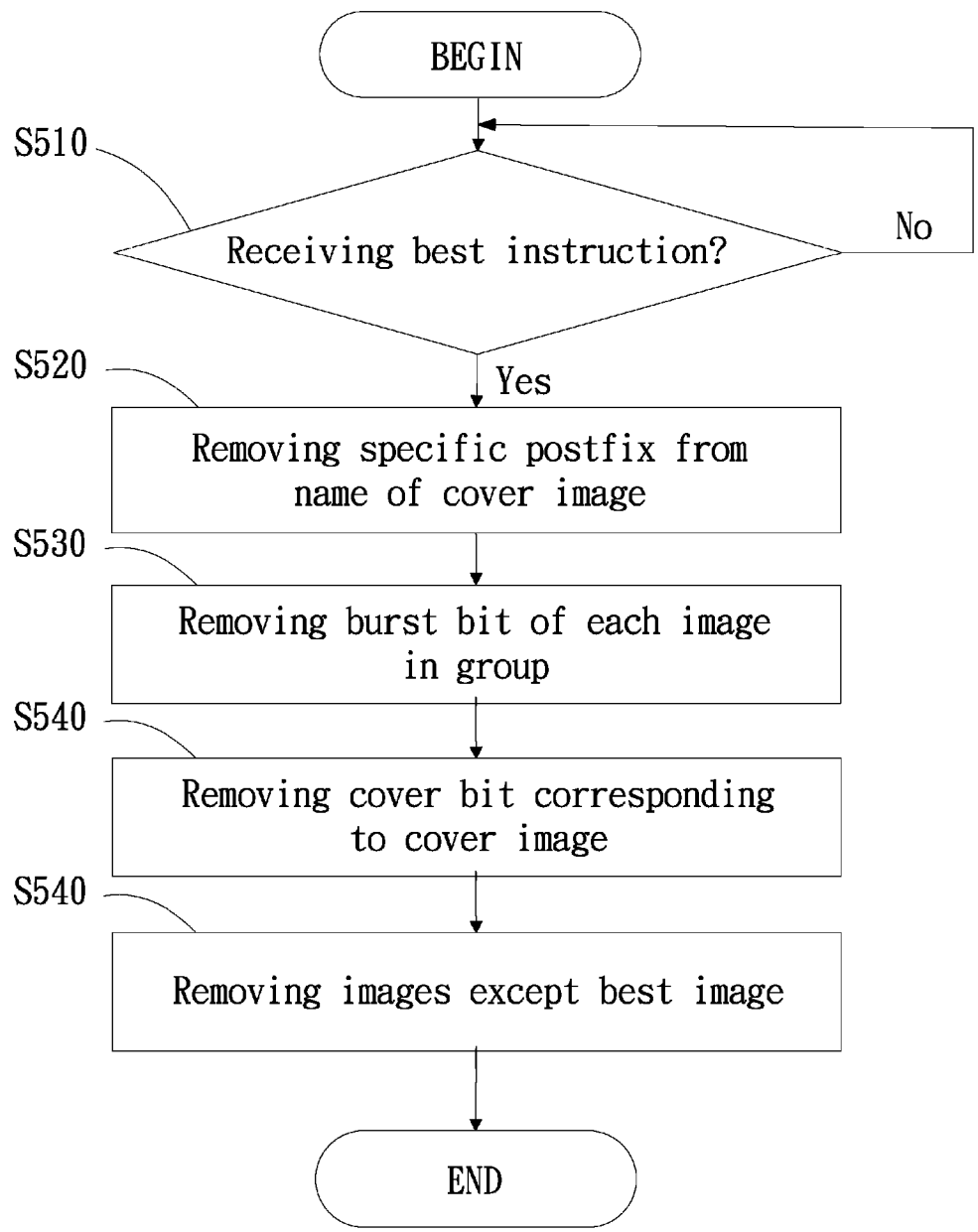
FIG. 5 is a flowchart of another embodiment of a name management method for burst shot of the invention.

FIG. 5 is a flowchart of another embodiment of a name management method for burst shot of the invention. In the embodiment, one of the burst images of a group corresponding to a burst shot is selected as the best image, such that only the best image is reserved, and other burst images of the group are removed.

In step S510, it is determined whether a best instruction for a group of burst images is received. It is noted that, a selection of one image within the group as the best image is also received with the best instruction. If no best instruction is received (No in step S510), the procedure remains at step S510. If a best instruction for a group of burst images is received (Yes in step S510), in step S520, the specific postfix is removed from the name of the cover image. Then, in step S530, a burst bit of each of the images in the group is removed, and in step S540, a cover bit corresponding to the cover image is removed. Then, in step S550, the images except the best image within the groups are removed.

Figure 6:
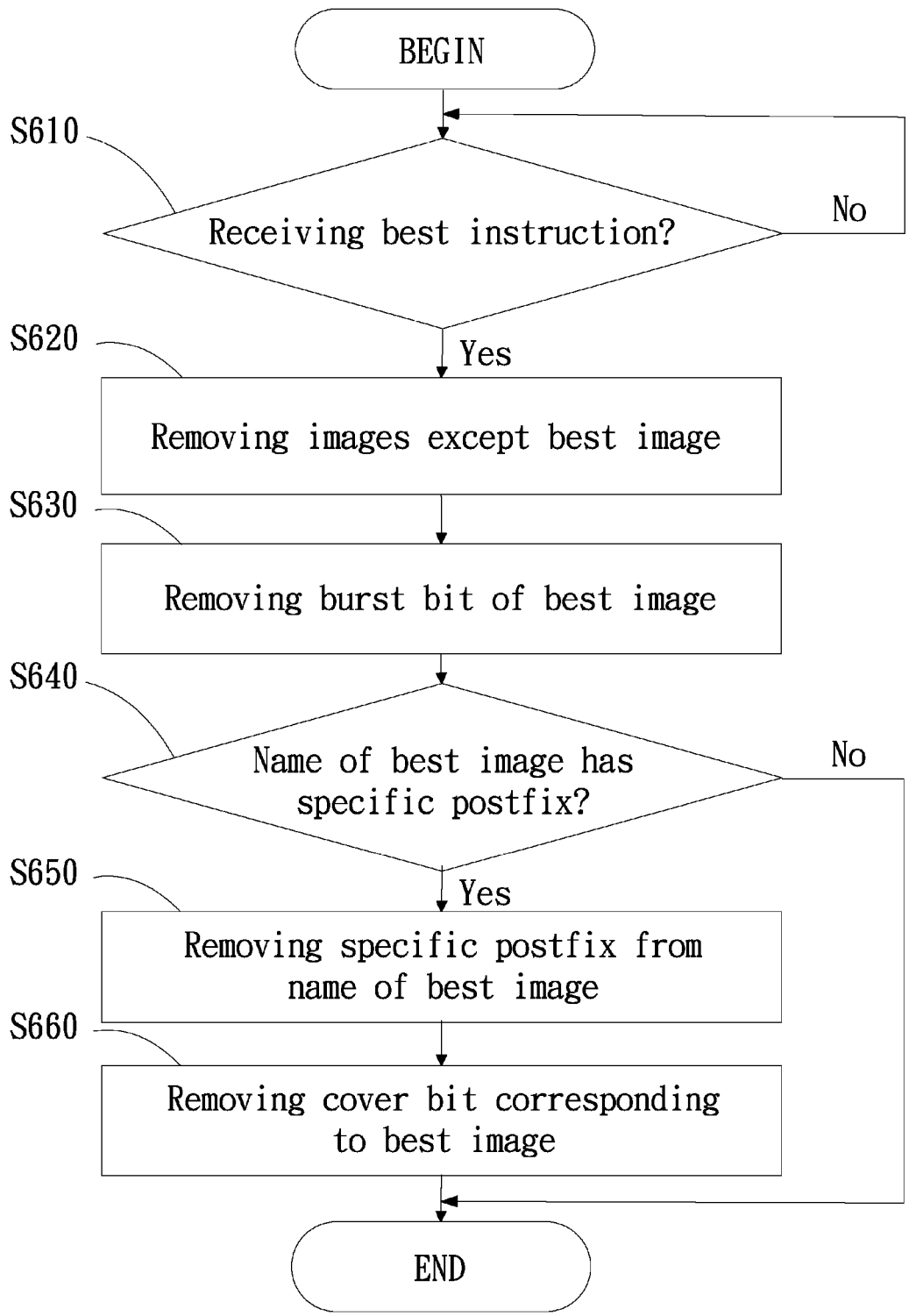
FIG. 6 is a flowchart of another embodiment of a name management method for burst shot of the invention.

FIG. 6 is a flowchart of another embodiment of a name management method for burst shot of the invention. In the embodiment, one of the burst images of a group corresponding to a burst shot is selected as the best image, such that only the best image is reserved, and other burst images of the group are removed.

In step S610, it is determined whether a best instruction for a group of burst images is received. It is noted that, a selection of one image within the group as the best image is also received with the best instruction. If no best instruction is received (No in step S610), the procedure remains at step S610. If a best instruction for a group of burst images is received (Yes in step S610), in step S620, the images except the best image within the group are removed. Then, in step S630, a burst bit of the best image is removed. In step S640, it is determined whether the name of the best image comprises the specific postfix. If the name of the best image does not comprise the specific postfix (No in step S640), the procedure is completed. If the name of the best image comprises the specific postfix (Yes in step S640), in step S650, the specific postfix is removed from the name of the best image, and in step S660, a cover bit corresponding to the best image is removed.

Figure 9:
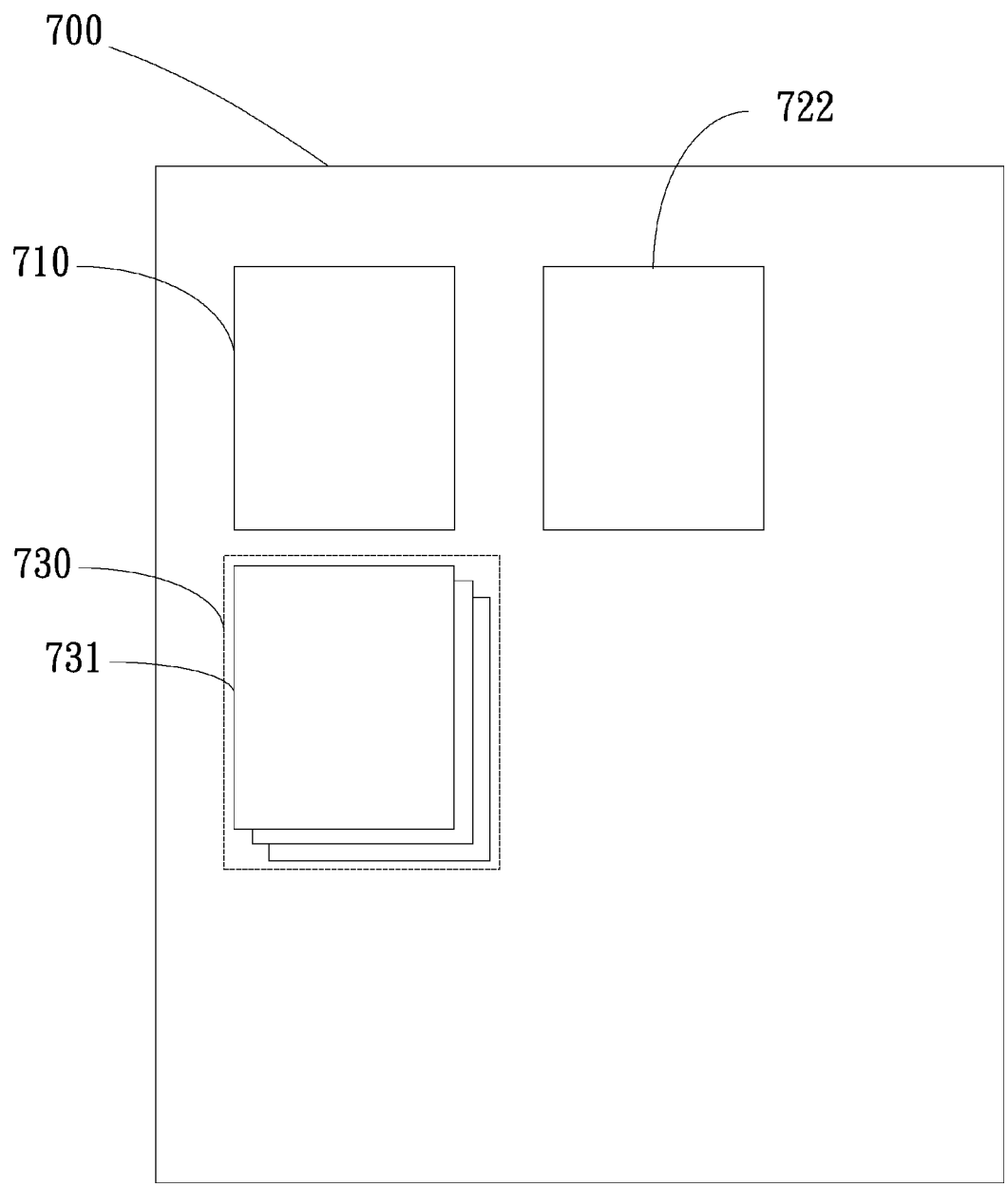
FIG. 9 is a schematic diagram illustrating an example of an interface displaying images upon a best instruction of the invention.

For example, when a best instruction for the group 720 shown in FIG. 7, wherein the image 722 is selected as the best image is received, the images (721 and 723) except the image 722 of the group 720 are removed, as shown in FIG. 9.

As described, when the memory card is removed from the portable device to another device, such as portable device or computer, the group relationship among the images may be lost. Therefore, in order to keep the group relationship, a group recovery mechanism is provided as follows.

Figure 10:
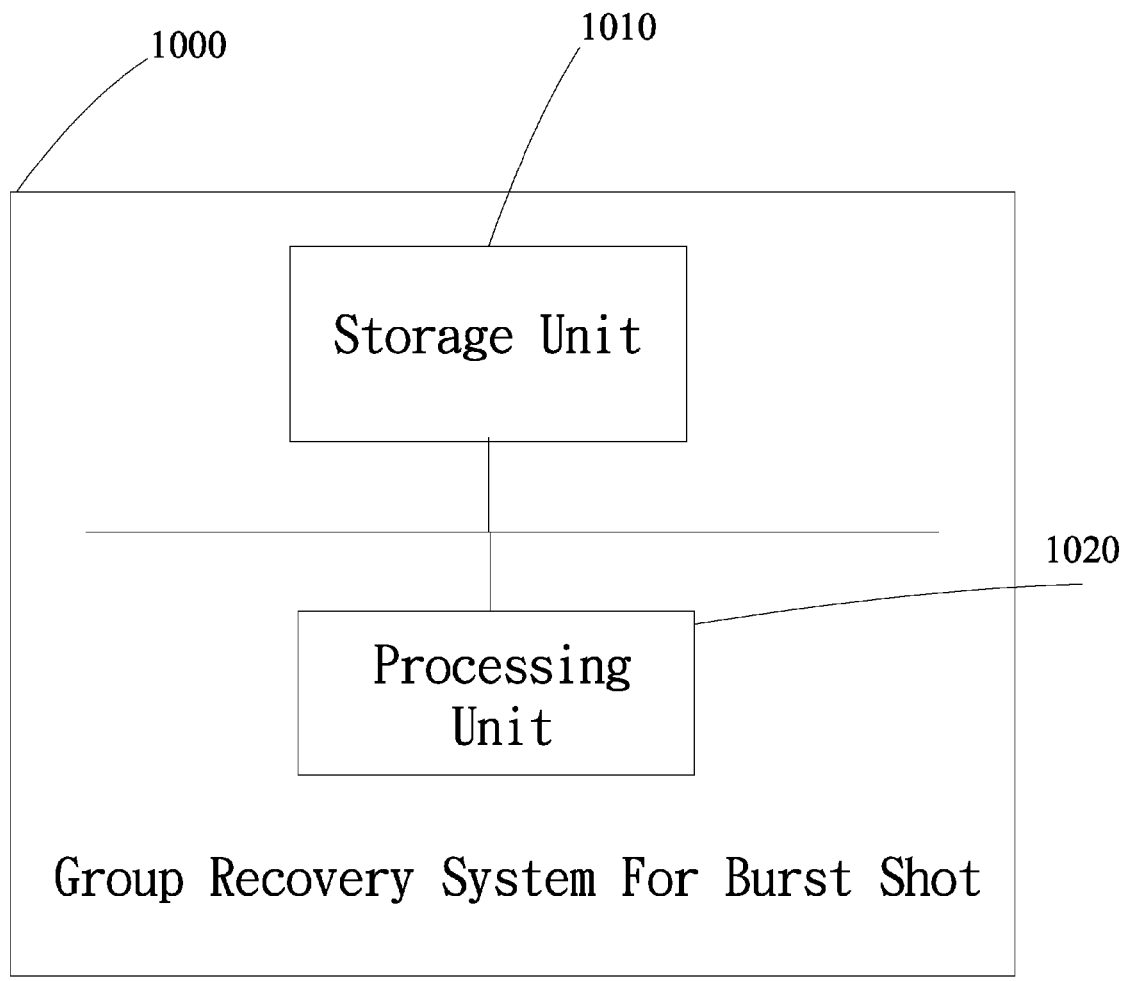
FIG. 10 is a schematic diagram illustrating an embodiment of a group recovery system for burst shot of the invention.

FIG. 10 is a schematic diagram illustrating an embodiment of a group recovery system for burst shot of the invention. The group recovery system for burst shot 1000 can be used in any processor-based electronic device, such as a computer, a portable device such as a notebook, a digital camera, a mobile phone, a smart phone, a PDA, and a GPS.

The group recovery system for burst shot 1000 comprises at least a storage unit 1010 and a processing unit 1020. The storage unit 1010 may be a built-in memory, or an external memory card of the group recovery system for burst shot 1000. The storage unit 1010 can comprise a plurality of images. It is understood that, in some embodiments, the images in the storage unit 1010 may be input from outside of the electronic device. The processing unit 1020 can control related components of the group recovery system for burst shot 1000, and perform the group recovery methods for burst shot of the invention, which will be discussed further in the following paragraphs. It is understood that, in some embodiments, the group recovery system for burst shot 1000 can further comprise a display unit for displaying the images in the storage unit 1010, and related figures, interfaces and data.

Figure 11:
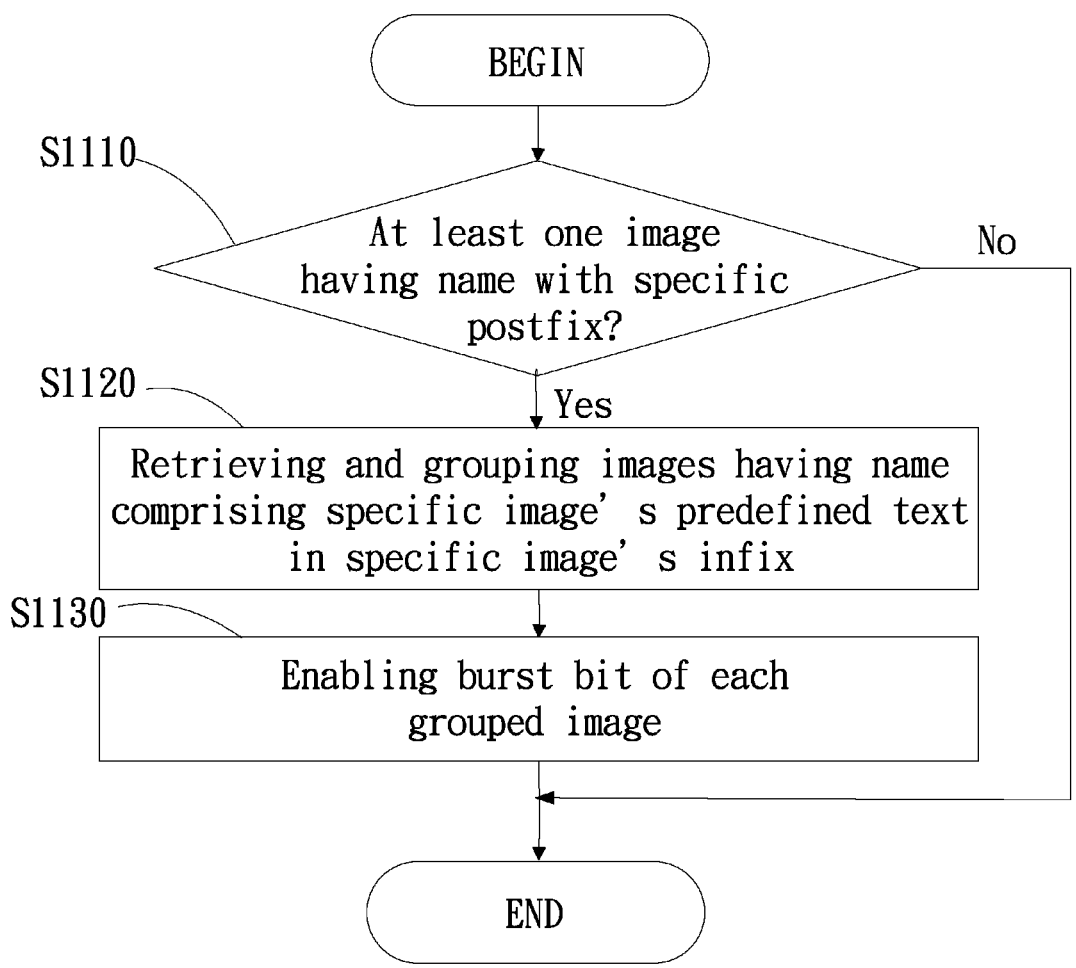
FIG. 11 is a flowchart of an embodiment of a group recovery method for burst shot of the invention.

FIG. 11 is a flowchart of an embodiment of a group recovery method for burst shot of the invention. The group recovery method for burst shot can be used in any processor-based electronic device, such as a computer, a portable device such as a notebook, a digital camera, a mobile phone, a smart phone, a PDA, and a GPS. In the embodiment, images are group recovered.

In step S1110, it is determined whether at least one image having a name comprising the specific postfix, such as 'COVER' is in the storage unit of the electronic device. If no image having a name comprising the specific postfix exists in the storage unit of the electronic device (No in step S1110), the procedure is completed. If a specific image having a name comprising the specific postfix is in the electronic device (Yes in step S1110), in step S1120, images having a name comprising at least one predefined text such as 'BURST' in an infix corresponding to the specific image are retrieved and grouped, and in step S1130, the burst bit of each grouped image is enabled.

Figure 12:
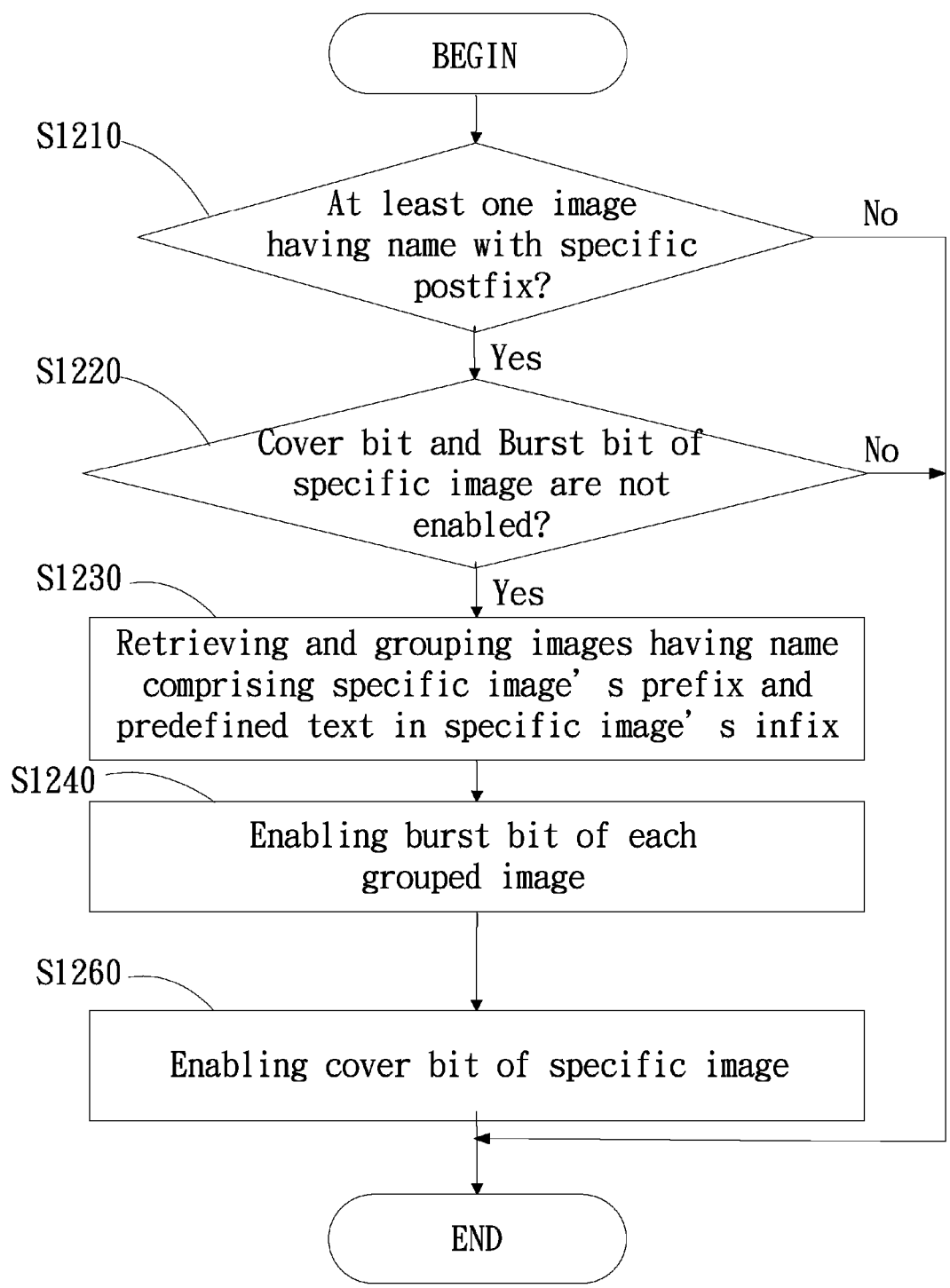
FIG. 12 is a flowchart of another embodiment of a group recovery method for burst shot of the invention

FIG. 12 is a flowchart of another embodiment of a group recovery method for burst shot of the invention. The group recovery method for burst shot can be used in any processor-based electronic device, such as a computer, a portable device such as a notebook, a digital camera, a mobile phone, a smart phone, a PDA, and a GPS. In the embodiment, images are group recovered.

In step S1210, it is determined whether at least one image having a name comprising the specific postfix, such as 'COVER' is in the storage unit of the electronic device. For performance concern, it may be further determined whether at least one image having a name comprising the specific prefix and infix. If no image having a name comprising the specific postfix exists in the storage unit of the electronic device (No in step S1210), the procedure is completed. If a specific image having a name comprising the specific postfix is in the electronic device (Yes in step S1210), in step S1220, it is determined whether a burst bit of the specific image is not enabled. If the burst bit of the specific image is enabled (No in step S1220), the procedure is completed. If the burst bit of the specific image is not enabled (Yes in step S1220), in step S1230, images having a name comprising a prefix such as 'IMAG0002' corresponding to the specific image and at least one predefined text such as 'BURST' in an infix corresponding to the specific image are retrieved and grouped, and in step S1240, the burst bit of each grouped image is enabled. In step S1260, the cover bit of the specific image is enabled.

Name management and group recovery methods for burst shot, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A name management method for burst shot for use in an electronic device, comprising:
performing a burst shot to continuously capture a group of a plurality of images in sequence;
naming each of the images in the group with a same prefix, and a respective infix, wherein the infixes of the respective images are progressively increased along the period of the burst shot, and the infix of the respective image comprising a first part of at least one second predefined text and a second part of a number corresponding to the capture order of the respective image in the group;
selecting one of the images within the group as a cover image of the group;
adding a specific postfix to the name of the selected image, determining whether a burst bit of the selected image is not enabled; and
if the burst bit of the selected image is not enabled, retrieving and grouping images having a name comprising the prefix corresponding to the selected image and the at least one second predefined text, and enabling the burst bit of each grouped image.

2. The method of claim 1, further comprising:
enabling a burst bit of each of the images in the group; and
enabling a cover bit corresponding to the selected image.

3. The method of claim 1, wherein the prefix comprises a first part of at least one first predefined text and a second part of an image index corresponding to an image capture process given by the electronic device.

4. The method of claim 3, wherein the name of a specific image within the group is IMAG0002_BURST003.jpg, in which 'IMAG' is the at least one first predefined text, '0002' is the image index corresponding to the image capture process given by the electronic device, 'BURST' is the at least one second predefined text, and '003' is the number corresponding to the capture order of the specific image in the group.

5. The method of claim 3, wherein the name of a specific image within the group is IMAG0002_BURST002_COVER.jpg, in which 'IMAG' is the at least one first predefined text, '0002' is the image index corresponding to the image capture process given by the electronic device, 'BURST' is the at least one second predefined text, '002' is the number corresponding to the capture order of the specific image in the group, and 'COVER' is the specific postfix.

6. The method of claim 1, wherein the second one of the continuously captured images is selected as the cover image of the group.

7. A group recovery method for burst shot for use in an electronic device, comprising:
- determining whether at least one image having a name comprising a specific postfix is in the electronic device; and
- if a specific image having a name comprising the specific postfix is in the electronic device, determining whether a burst bit of the specific image is not enabled; and
- if the burst bit of the specific image is not enabled, retrieving and grouping images having a name comprising at least one predefined text in an infix corresponding to the specific image, and enabling a burst bit of each grouped image.

8. The method of claim 7, further comprising:
- determining whether a cover bit of the specific image is not enabled; and
- if the cover bit of the specific image is not enabled, enabling the cover bit of the specific image.

9. The method of claim 7, wherein each of the retrieved and grouped images has a name comprising a prefix corresponding to the specific image.

10. The method of claim 7, wherein the prefix comprises a first part of at least one first predefined text and a second part of an image index corresponding to an image capture process given by the electronic device, and the infix of the respective image comprises a first part of at least one second predefined text and a second part of as number corresponding to the capture order of the respective image in the group.

11. The method of claim 10, wherein the name of a specific image within the group is IMAG0002_BURST003.jpg, in which 'IMAG' is the at least one first predefined text, '0002' is the image index corresponding to the image capture process given by the electronic device, 'BURST' is the at least one second predefined text, and '003' is the number corresponding to the capture order of the specific image in the group.

12. The method of claim 10, wherein the name of a specific image within the group is IMAG0002_BURST002_COVER.jpg, in which 'IMAG' is the at least one first predefined text, '0002' is the image index corresponding to the image capture process given by the electronic device, 'BURST' is the at least one second predefined text, '002' is the number corresponding to the capture order of the specific image in the group, and 'COVER' is the specific postfix.

13. A non-transitory machine-readable storage medium comprising a computer program, which, when executed causes a device to perform a name management method for burst shot, wherein the method comprises:
- performing a burst shot to continuously capture a group of a plurality of images in sequence;
- naming each of the images in the group with a same prefix, and a respective infix, wherein the infixes of the respective images are progressively increased along the period of the burst shot, and the infix of the respective image comprising a first part of at least one second predefined text and a second part of a number corresponding to the capture order of the respective image in the group;
- selecting one of the images within the group as a cover image of the group;
- adding a specific postfix to the name of the selected image; and
- determining whether a burst bit of the selected image is not enabled; and
- if the burst bit of the selected image is not enabled, retrieving and grouping images having a name comprising the prefix corresponding to the selected image and the at least one second predefined text, and enabling the burst bit of each grouped image.

14. A non-transitory machine-readable storage medium comprising a computer program, which, when executed, causes a device to perform a group recovery method for burst shot, wherein the method comprises:
- determining whether at least one image having a name comprising a specific postfix is in the electronic device; and
- if a specific image having a name comprising the specific postfix is in the electronic device, determining whether a burst bit of the specific image is not enabled; and
- if the burst bit of the specific image is not enabled, retrieving and grouping images having a name comprising at least one predefined text in an infix corresponding to the specific image, and enabling a burst bit of each grouped image.

* * * * *